United States Patent [19]

Suzuki et al.

[11] Patent Number: 4,781,059
[45] Date of Patent: Nov. 1, 1988

[54] METHOD AND APPARATUS FOR DETECTING COMBUSTION PRESSURE IN ENGINE

[75] Inventors: Seikoo Suzuki, Hitachiota; Masayuki Miki, Katsuta; Matsuo Amano; Takao Sasayama, both of Hitachi, all of Japan

[73] Assignee: Hitachi, Ltd., Tokyo, Japan

[21] Appl. No.: 884,037

[22] Filed: Jul. 10, 1986

[30] Foreign Application Priority Data

Jul. 10, 1985 [JP] Japan .................. 60-150240

[51] Int. Cl.[4] .................. G01L 19/04; G01M 15/00
[52] U.S. Cl. .................. 73/117.3; 73/115; 73/705; 73/708
[58] Field of Search .................. 73/117.3, 118.1, 35, 73/705, 708, 116, 4 R, 115

[56] References Cited

U.S. PATENT DOCUMENTS

| | | | |
|---|---|---|---|
| 3,580,082 | 3/1970 | Strack | 73/705 |
| 3,625,054 | 12/1971 | Vesper et al. | 73/115 |
| 4,111,041 | 9/1978 | Rice | 73/115 |
| 4,158,310 | 6/1979 | Ho | 73/705 |
| 4,165,650 | 8/1979 | Weissler, II | 73/115 |
| 4,403,505 | 9/1983 | Hattori et al. | 73/117.3 |
| 4,452,072 | 6/1984 | Damson et al. | 73/116 |
| 4,531,399 | 7/1985 | Aono | 73/4 R |
| 4,537,065 | 8/1985 | Ootsuka et al. | 73/117.3 |
| 4,583,507 | 4/1986 | Greeves et al. | 73/116 |
| 4,598,381 | 7/1986 | Cucci | 73/708 |
| 4,604,899 | 8/1986 | Yamada et al. | 73/708 |
| 4,620,093 | 10/1986 | Barkhoudarian et al. | 73/705 |

FOREIGN PATENT DOCUMENTS 855570 12/1960 United Kingdom .................. 73/116

Primary Examiner—Stewart J. Levy
Assistant Examiner—Robert R. Raevis
Attorney, Agent, or Firm—Ladas & Parry

[57] ABSTRACT

A combustion pressure detecting apparatus for generating an electrical signal in response to a combustion pressure of an internal combustion engine, wherein an electrical signal based on said combustion pressure is detected at a predetermined angle of rotation of said engine, the detected value being compared with a predetermined reference value to derive a difference therebetween, including correcting means for executing correcting operations in dependence on said difference.

10 Claims, 4 Drawing Sheets

METHOD AND APPARATUS FOR DETECTING COMBUSTION PRESSURE IN ENGINE

BACKGROUND OF THE INVENTION

1. Field of the Invention

The present invention relates to a method and an apparatus for detecting combustion pressure in an internal combustion engine. More particularly, the present invention concerns a combustion pressure detecting method and apparatus for an engine whereby errors in detection may be rectified.

2. Description of the Prior Art

There are various known pressure sensors for detecting combustion pressure in an engine such as those of piezo-electric type, semiconductor type, capacitive type and others. However, every one of these known sensors encounters difficulty in detecting the pressure of combustion with a reasonably high accuracy over an extended period (use life) under adverse environmental conditions such as high voltage, high temperature and high pressure. Thus none of these sensors is particularly suited for installation to motor vehicles. In addition to the aforementioned sensors, there may be mentioned a pressure sensor in which optical fibers are used. By way of example, Japanese Unexamined Patent Publication No. 59-60334 discloses a typical one of the hitherto known pressure sensor in which optical fibers are used.

The known pressure sensor employing optical fiber is generally intended for use in process controls. When this sensor is employed as a combustion pressure detecting device in an engine, there arises a problem that temperature of the pressure detecting device itself varies over a very wide range under the influence of combustion temperature in the engine so the device has the disadvantage that it is impossible to accurately measure the combustion pressure.

SUMMARY OF THE INVENTION

An object of the invention is to provide a combustion pressure detecting method and apparatus which is capable of detecting the combustion pressure accurately even under the adverse influence of environmental factors such as, inter alia, a wide variation of the ambient temperature.

The present invention resides in the provision of correcting means for the combustion pressure detecting apparatus.

According to a first aspect of the invention there is provided a method of detecting combustion pressure in an internal combustion engine for generating an electrical signal in response to said pressure, comprising the steps of producing an electric signal based on said combustion pressure at a predetermined angle of rotation of said engine, comparing the detected value with a predetermined reference value to derive a difference signal therebetween, and using said difference signal to execute correcting operations to bring said difference toward zero.

In a first correcting method, of the invention; deviation of the output of the pressure sensor from a predetermined value at a predetermined angle of rotation of a shaft of the engine is detected, so that a correcting value for zeroing the deviation is utilized for varying the operating conditions of the sensor. The correcting value thus generated may be utilized for correcting the sensor output or of the detecting means to obtain the corrected value of measurement. By way of example, the correcting value may be utilized for varying the bias of the sensor. Preferably an optical fiber type sensor is used and the correcting value may be utilized for controlling the intensity of light output of light emitting means and/or of the light detecting means. The sensor intended for use in a motor vehicle should preferably exhibit an enhanced insusceptibility to noise and in this connection, an optical fiber type sensor exhibits an excellent noise insusceptibility. Accordingly, in the following description of the preferred embodiment of the invention, it is assumed that an optical fiber type sensor is employed as a typical example.

BRIEF DESCRIPTION OF THE DRAWINGS

The invention will now be described by way of example in which.

DESCRIPTION OF THE PREFERRED EMBODIMENTS

Figure 1:
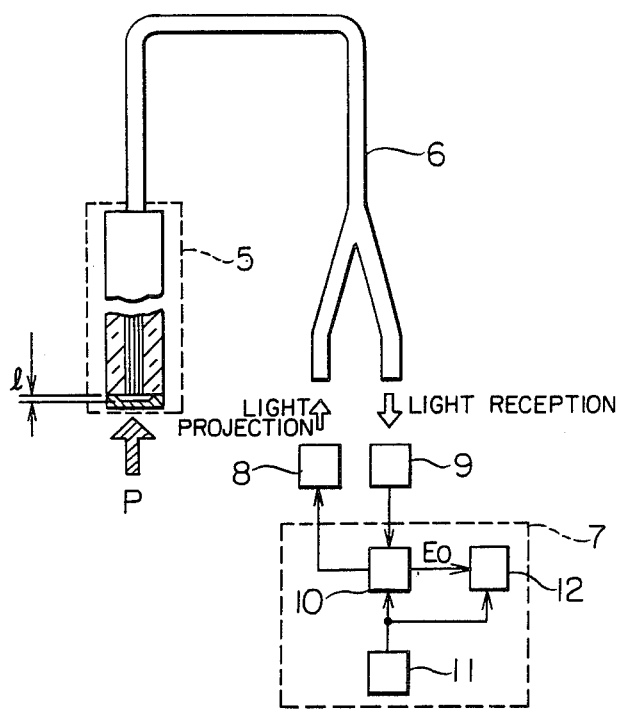
FIG. 1 is a block diagram showing an embodiment of the present invention with one form of learning/correcting circuit.
Figure 2:
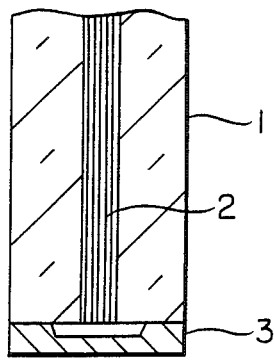
FIG. 2 is a view showing schematically a structure of a detecting portion of a combustion pressure sensor in which optical fibers are employed.

FIG. 1 shows a combustion pressure detecting apparatus according to an embodiment of the present invention, and FIG. 2 shows a detail of the detecting portion thereof. The detecting portion (sensor) comprises a pipe 1 made of boro-silicated glass, optical fibers 2 fixedly secured within the pipe 1 by means of a refractory adhesive and a silicon diaphragm 3 having a recess in the vicinity of the end of the fibers 2 to define a gap therebetween, the diaphragm being anodically bonded to an end face of the glass pipe 1.

Figure 3:
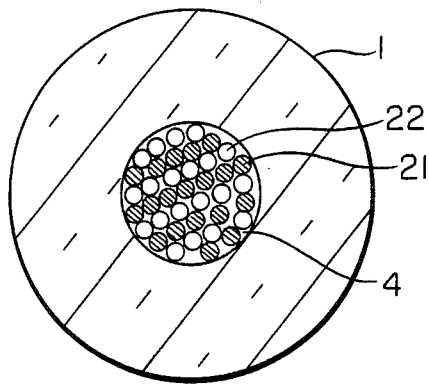
FIG. 3 is a view showing the form in which the optical fibers are secured within a pipe of glass.

The form of the optical fibers 2 secured within the glass pipe 1 is shown in FIG. 3. In the FIG. 3, a fiber bundle containing light projecting optical fibers 21 and light receiving optical fibers 22 is fixedly secured within the bore of the glass pipe 1 by a refractory adhesive 4 of inorganic material such as pulverized glass. After fixation of the fibers, the end faces of the glass pipe 1, the light projecting optical fibers 21 and the light receiving optical fibers 22 are ground and polished to a mirror quality so that the end faces lie in a single plane. By polishing the end face of the glass pipe 1 to the grade of a mirror surface quality, it is possible to bond the silicon diaphragm 3 with a high bonding strength through the anodic bonding process (i.e. an electrochemical bonding at high voltage and high temperature). Since the glass pipe 1, the light projecting fibers 21, the light receiver fibers 22 and the refractory adhesive 4 are made of inorganic materials such as vitreous compositions, these structural components resist thermal distortion even when the ambient temperature changes. Accordingly, any tendency for cracks to be produced in the bonded portions of these structural components is suppressed to a minimum. Further, the end faces of the glass pipe 1, the light projecting optical fibers and the light receiving optical fibers can be maintained at positions lying substantially on one and the same plane regardless of variations in the ambient temperature. The detecting portion or sensor is employed for measuring the combustion pressure by determining the quantity of light reflected at the deformable silicon diaphragm and received by the light receiving optical fibers 22, the light being initially projected from the light projecting optical fibers 21.

Figure 4:
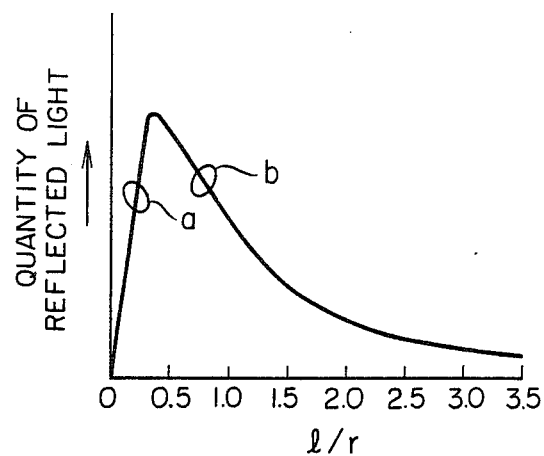
FIG. 4 is a view showing relationship between the quantity of reflected light and a gap.

In the following, a method of measuring the combustion pressure by making use of the amount of reflected light will be described. A relationship between the quantity of reflected light and a gap is illustrated in FIG. 4. When the radius of each optical fiber is represented by r and the gap between the silicon diaphragm and the end face of the optical fiber is represented by l, the quantity of reflected light is such as illustrated in FIG. 4. As will be seen, the quantity of reflected light is at maximun when l/r=0.35. Experiments conducted by the inventors have shown that the combustion pressure can be detected linearly at regions a and b illustrated in FIG. 4. From the viewpoint of miniaturization of the detecting portion or sensor, the region a is preferred where the quantity of reflected light changes more steeply.

Next, an apparatus for detecting the combustion pressure in the engine according to an embodiment of the invention will be described by referring to FIG. 1. A measuring channel is constituted by a detecting portion 5, an optical fiber bundle 6 and a learning/correcting unit 7. The latter, in turn, is composed of a light emitting element 8 such as LED, a light detecting element 9 such as silicon pin photodiode and a signal processing circuit 10 for controlling the quantity of light emitted by the light emitting element 8 in response to a signal produced by a bottom dead point sensor 11. Further, the signal processing circuit 10 produces an output voltage signal $E_O$ proportional to the combustion pressure P, which signal is transmitted to an engine controlling microcomputer 12.

As described above, the silicon diaphragm of the detecting portion 5 is fixedly bonded to the glass pipe which has a thermal coefficient of expansion substantially equal to that of the diaphragm so that a stable relationship is provided between the pipe and the diaphragm. Consequently, even when the temperature of the detecting portion 5 varies over a wide range under the influence of combustion temperature in the engine, any change in the gap l set between the end face of the optical fiber bundle and the silicon diaphragm when the combustion pressure P is substantially equal to the atmospheric pressure when the engine is at bottom dead center can be compensated by a learning/correcting system hereinafter described. In other words, this invention provides a combustion pressure detecting apparatus in which a reference value output signal is produced in a combustion chamber when the pressure therein is substantially equal to the atmospheric pressure and said output is independent of temperature, whereby the measurement of the combustion pressure P at other than bottom dead center can be determined with high accuracy. Further, since the detecting portion 5 is constituted by elements made of similar vitreous materials having substantially equal thermal coefficients of expansion, the detecting portion 5 will not be harmed by the adverse environmental conditions of high temperature and high pressure brought about by combustion, thus ensuring high reliability of measurement of the combustion pressure over an extended period. The detecting portion 5 is mounted on an ignition plug and thus used in the vicinity of the point to which an ignition voltage of several thousand volts is applied. However, since the detecting portion 5 operates by detecting the quantity of reflected light, the detecting portion 5 is unlikely to be subjected to the influence of high voltage. It should be mentioned that the gap l at atmospheric pressure is so selected as to fall within a range of several microns to several tens of microns.

Figure 5:
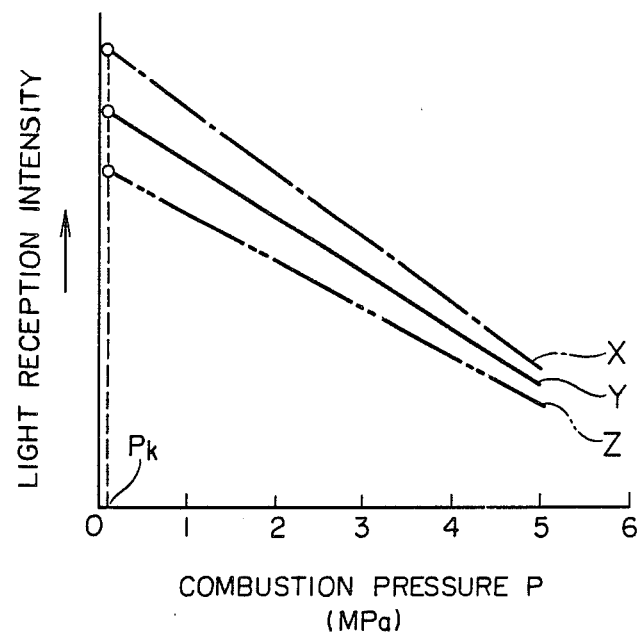
FIG. 5 is a view illustrating relationships between the combustion pressure and light reception sensitivity.

In the following, the learning/correcting system will be described. The relationship between the combustion pressure P and the light intensity detected by element a is illustrated in FIG. 5 with the pressure P being taken in terms of the absolute pressure on the assumption that the gap l between the silicon diaphragm and the end face of the optical fiber bundle is set within the region a shown in FIG. 4. The gap l is decreased linearly as a function of increasing combustion pressure P. Consequently the light reception intensity of the light receiving element 9 is decreased as the combustion pressure P increases, as shown in FIG. 5. The relation between the light reception intensity and the combustion pressure is modified, as indicated by characteristic curves X, Y and Z, due to the light intensity emitted by the light emitting element 8, the light transfer constants of optical couplers (or optical connectors, not shown) disposed, respectively, between the optical fiber bundle 6 and each of the light emitting element 8 and the light receiving element 9, the light transfer constant of the optical fiber bundle, and the reflection factor of the diaphragm surface varying because of external factors such as temperature variation, contamination, vibration and others.

It will be seen that all the light reception intensities represented by the characteristic curves X, Y and Z change linearly. Fortunately, it has been experimentally established that the characteristics X, Y and Z can be made to coincide perfectly with one another over the whole measuring range of the combustion pressure P by setting the light reception intensities (values indicated by circles in FIG. 5) on the characteristic curves at a predetermined pressure value $P_K$ equal to one another by predeterminedly varying the light intensity of the light emitting element 8 through the signal processing circuit 10. In particular, the pressure $P_K$ corresponds to the combustion pressure at a predetermined engine state, e.g. the state in which the piston within the engine cylinder is positioned at the bottom dead point, as described hereinafter.

The possibility that coincidence between the characteristics X, Y and Z may be provided is due to the fact that the zero point drift of the light reception intensity with respect to the combustion pressure P, substantially does not take place but only the change in span occurs. This is because the relation between the combustion pressure P and the gap l does not substantially vary even under the external disturbance such as temperature change, as described hereinbefore. More specifically since the detecting portion 5 is constituted by components having approximately the same thermal expansion coefficients and additionally by the anodic bonding between pipe 1 and diaphragm 3 requiring no adhesive, the change in the gap l can remain very small in spite of external disturbance such as temperature change.

Figure 6:
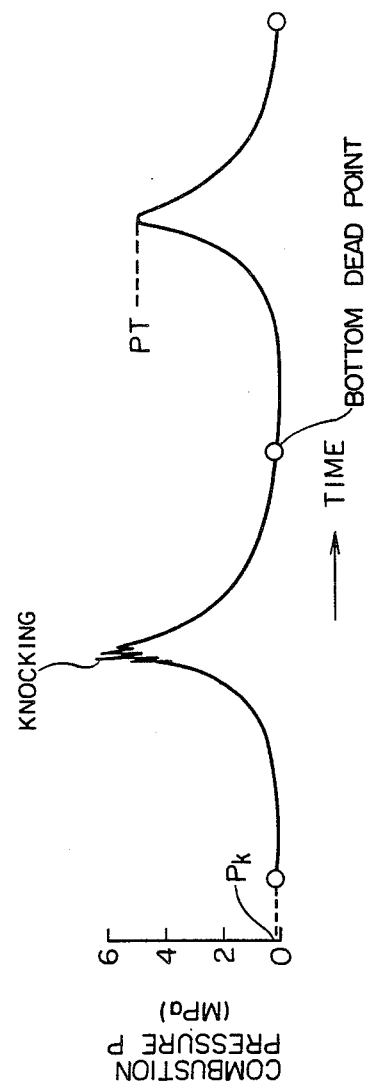
FIG. 6 is a view illustrating a waveform of the combustion pressure and a correcting procedure.

A waveform representative of change in the combustion pressure is illustrated in FIG. 6. In dependence on the state of combustion in the engine, a so-called knocking phenomenon may take place, resulting in an output waveform of high frequency. In FIG. 6, circles represent the engine state in which the piston assumes the bottom dead point. The peak value PT of the combustion pressure appears periodically and varies in dependence on such factors as air-fuel ratio, ignition timing and others. However, the combustion pressure $P_K$ at the bottom dead point is substantially independent of the state of combustion and assumes a substantially constant value (which is substantially equal to the atmospheric pressure although in the strict sense it differs from the latter). By taking advantage of this property, the learning/correction of the combustion pressure sensor can be realized.

A process of the learning/correction will be described in conjunction with the system shown in FIG. 1. On the basis of an output signal of the engine bottom dead point sensor 11 which is adapted to detect the bottom dead point (instead of providing this sensor, the bottom dead point may alternatively be estimated from the output of a crank angle sensor), the light intensity emitted by the light emitting element 8 is controlled by the signal processing circuit 10 (e.g. by controlling the voltage supplied to the light emitting element) so that the light reception intensity of the light receiving element 9 remains constant at every bottom dead point. Basically this is achieved by, at every bottom dead point, latching the light intensity received by element 9, comparing it with a predetermined voltage, and in dependence upon the comparison producing a difference signal to adjust the light output of element 8. As a result, the output signal of the combustion pressure sensor is automatically and periodically corrected through the learning procedure, as described in conjunction with FIG. 5.

Figure 7:
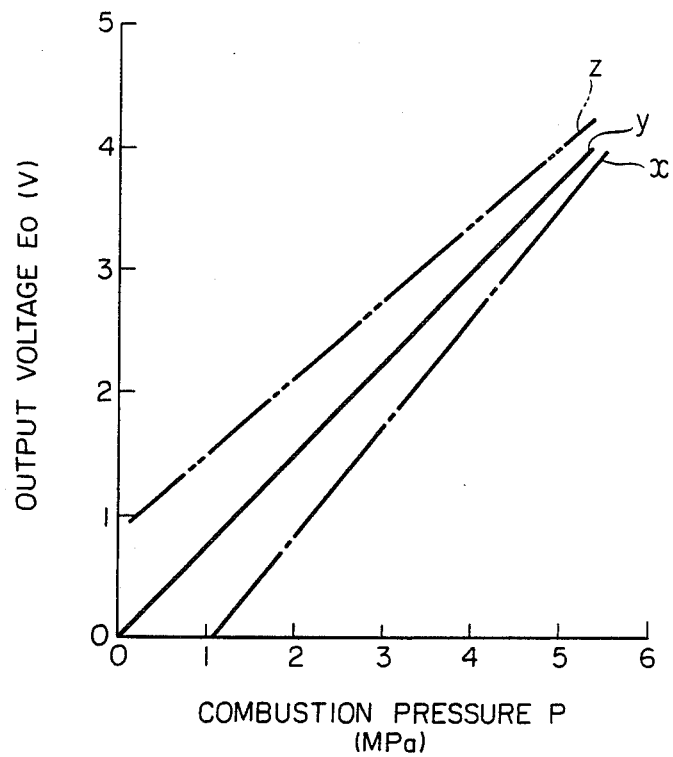
FIG. 7 is a view for illustrating output characteristics of the combustion pressure sensor.

The output characteristics of the combustion pressure sensor are illustrated in FIG. 7. The output characteristics are obtained by processing the changes in the light reception intensity of the light receiving element 9 through the signal processing circuit 10. In the figure, the standardized output characteristic accompanied with no detection error is indicated by a curve y.

When the learning/correction according to the instant embodiment is not adopted, the output characteristic is such as indicated by a curve x assuming the light reception intensity is increased, while the characteristic curve z is obtained when the light reception intensity is reduced. It should be mentioned that by adopting the periodical learning/correcting procedure, the output characteristic always follows the standardized characteristic curve y even when the light reception intensity is significantly increased or decreased due to external factors other than the changes in the combustion pressure P.

Figure 8:
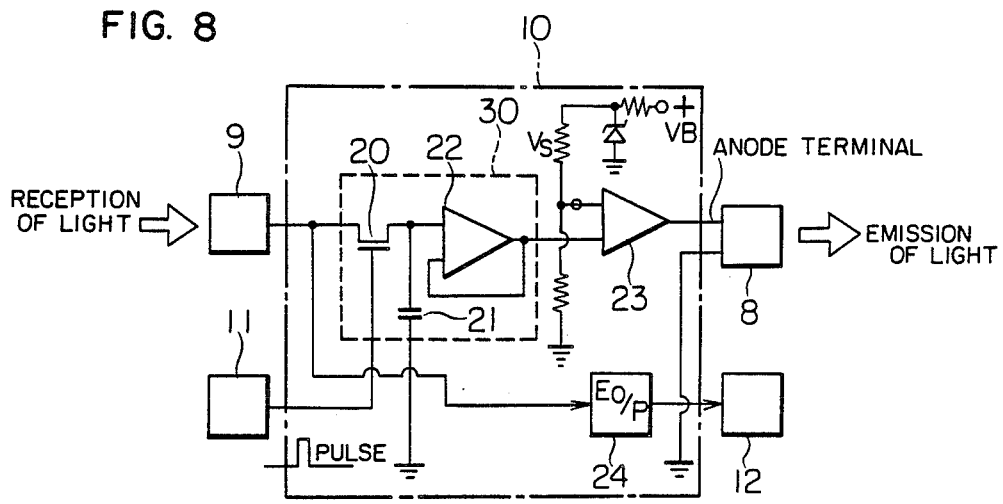
FIG. 8 is a view showing in detail a signal processing circuit.

Details of the signal processing circuit 10 of FIG. 1 are shown in FIG. 8. In response to detection of the bottom dead point, the bottom dead point sensor 11 produces an output signal and a switch 20 is closed to cause the light reception intensity of the light receiving element 9 to be held by a capacitor 21. The pulse width of the pulse signal produced by the bottom dead point sensor 11 for opening and closing the switch 20 is selected to be less than several hundred microseconds ($\mu$s). The output voltage of a sample and hold circuit 30 constituted by the switch 20, the capacitor 21 and a buffer amplifier 22 is compared in a comparator 23 with a set voltage $V_s$, a difference signal output of the comparator controlling the anode voltage of the light emitting element 8. As a consequence, the light reception intensity at every bottom dead point becomes constant independent of the temperature change and/or other external disturbance due to the feedback arrangement driving the difference between the compared outputs to zero. Further, the thus corrected intensity light reception of the light receiving element 9 is transformed into an output voltage $E_o$ corresponding to the varying combustion pressure through a signal converter circuit 24, the output voltage $E_o$ being transmitted to the microcomputer 12 for utilisation.

We claim:

1. A combustion chamber pressure detecting apparatus comprising a combustion pressure detecting sensor which includes a diaphragm with a light reflecting surface which is deformable under the combustion pressure in the engine, light emitting means, light detecting means, optical fibers for introducing light from the light emitting means to the reflecting surface and introducing light reflected from said reflecting surface to the light detecting means, means for detecting said combustion pressure from the output of said light detecting means, comparator means for receiving as an input the output of the detecting means and as another input a reference value, said comparator means comparing the inputs applied thereto and producing a correcting signal on the basis of the output of the light detecting means at a predetermined angle of rotation of the engine, and means for applying the correcting signal to said light emitting means whereby the difference in value of the inputs to the comparator means are brought to zero.

2. An apparatus as claimed in claim 1 wherein said correcting signal is used to vary the light emission from the light emitting means so that the light intensity received by the light detecting means at said predetermined angle of rotation of said engine is substantially constant.

3. In an internal combustion engine, a chamber pressure detecting apparatus comprising a light sensor means, a portion of said light sensor means being positioned in the combustion chamber for detecting pressure in said chamber, a comparator having one input thereof connected to receive signals from the light sensor means and another input thereof connected to receive a reference signal value, and timing means for enabling an electrical signal from the light sensor means representative of a known combustion pressure produced at a predetermined angle of rotation of said engine to be applied to the comparator, whereby said electrical signal is compared with said reference signal value by said comparator to produce a difference value and an output of said comparator is connected to means for adjusting the light sensor means to bring said difference value toward zero so that error in said apparatus when detecting another electrical signal produced at pressures other than said known pressure is reduced.

4. An apparatus as claimed in claim 3 wherein the timing means includes a crank shaft angle detector arranged to apply said electrical signal to said comparator upon detection of bottom dead center of the crank shaft.

5. An apparatus as claimed in claim 4 wherein said light sensor comprises a light emitting means, a light detecting means, a diaphragm with a light reflecting surface which is deformable under the combustion pressure in the engine chamber, optical fibres for introducing light from said emitting means to said light reflecting surface and for applying the reflecting state of said light reflecting surface to said light detecting means, said comparator comparing the output of said light detecting means produced at bottom dead center of said crank with said reference signal value for producing said difference value and said means for adjusting being connected to vary the output of said light emitting means with said difference value to bring said difference value toward zero.

6. An apparatus as claimed in claim 5 wherein means are provided for applying said electrical signal produced at times other than bottom dead center of the crank shaft to a microcomputer for use in controlling the operation of the engine.

7. A method of detecting pressure in an internal combustion engine by apparatus for generating an electrical signal representative of a known combustion pressure at a predetermined angle of rotation of said engine and another electrical signal representative of a pressure at an angle of rotation of said engine other than said predetermined angle, including the steps of using a light sensor means, a portion of said light sensor means being positioned in the combustion chamber for detecting pressure in said chamber and to produce said electrical signal based on the combustion pressure at said predetermined angle of rotation of said engine, comparing the electrical signal with a predetermined reference signal value to derive a difference signal therebetween, and using said difference signal to vary the operating parameters of said light sensor means to bring said difference signal toward zero so that error in the apparatus is reduced when said another electrical signal is generated.

8. A method as claimed in claim 7 wherein said predetermined angle of rotation of said crank shaft is bottom dead center.

9. A method as claimed in claim 8 wherein the light sensor means comprises a diaphragm located in said chamber, optical fibres extending from said diaphragm to a light emitting means and a light detecting means, said diaphragm being deformable under the combustion pressure in said engine, said optical fibres introducing light from said emitting means to said light reflecting surface and for applying the reflected state of said light reflecting surface to said light detecting means, comparing output of the light detecting means produced at bottom dead center of said crank shaft with said reference signal value to produce said difference value and an adjusting means arranged to vary the output of said light emitting means with said difference value to bring said difference value towards zero.

10. A method as claimed in claim 9 wherein said another electrical signal produced at combustion chamber pressures other than bottom dead center is applied to a microcomputer for controlling operation of said engine.

* * * * *